US012811692B2

(12) United States Patent
Guan et al.

(10) Patent No.: US 12,811,692 B2
(45) Date of Patent: Nov. 24, 2026

(54) MONITORING COHERENT OPTICAL SERVICE CHANNEL

(71) Applicant: Microsoft Technology Licensing, LLC, Redmond, WA (US)

(72) Inventors: Binbin Guan, Issaquah, WA (US); Yawei Yin, Redmond, WA (US); Jamie Dorea Gaudette, Kirkland, WA (US); Denizcan Billor, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 691 days.

(21) Appl. No.: 18/325,684

(22) Filed: May 30, 2023

(65) Prior Publication Data

US 2024/0405881 A1 Dec. 5, 2024

(51) Int. Cl.

| | |
|---|---|
| ***H04B 10/07*** | (2013.01) |
| ***H04B 10/25*** | (2013.01) |
| ***H04B 10/532*** | (2013.01) |
| ***H04B 10/556*** | (2013.01) |
| *H04B 10/2581* | (2013.01) |
| *H04J 14/04* | (2006.01) |

(52) U.S. Cl.

CPC ........... *H04B 10/532* (2013.01); *H04B 10/25* (2013.01); *H04B 10/556* (2013.01); *H04B 10/07* (2013.01); *H04B 10/2581* (2013.01); *H04J 14/04* (2013.01)

(58) Field of Classification Search

CPC .... H04B 10/532; H04B 10/25; H04B 10/556; H04B 10/2581; H04B 10/07; H04J 14/05; H04J 14/06; H04J 14/04

USPC .......................................... 398/9–38, 43–103

See application file for complete search history.

(56) References Cited

U.S. PATENT DOCUMENTS

| | | | | |
|---|---|---|---|---|
| 9,838,128 | B1 * | 12/2017 | Rusch | G02B 6/34 |
| 2012/0170929 | A1 * | 7/2012 | Xie | H04B 10/0793 398/33 |
| 2014/0063592 | A1 * | 3/2014 | Ip | H01S 3/06754 359/337.1 |
| 2015/0229437 | A1 * | 8/2015 | Djordjevic | H04L 1/0058 714/776 |
| 2017/0353241 | A1 * | 12/2017 | Fazal | H04B 10/2581 |
| 2017/0353265 | A1 * | 12/2017 | Mansouri Rad | H04B 10/0775 |
| 2018/0302154 | A1 * | 10/2018 | Ferreira | H04J 14/04 |

OTHER PUBLICATIONS

Sleiffer et al, 73.7 Tb per s (96x3x256-Gb per s) mode-division-multiplexed DP-16QAM transmission, Nov. 2012, Optics Express, All Document. (Year: 2012).*

(Continued)

*Primary Examiner* — Dibson J Sanchez

(74) *Attorney, Agent, or Firm* — Holzer Patel Drennan

(57) ABSTRACT

A system for monitoring coherent optical service channel includes a transmitter configured to generate a multiple polarization signal based on an input signal, a hollow core fiber (HCF) configured to transmit the multiple polarization signal, a receiver configured to receive the multiple polarization signal, and a digital signal processor (DSP) configured to monitor one or more operating parameters of the received multiple polarization signal. The multiple polarization signal may use both the phase and the frequency polarization to multiplex the optical signal.

18 Claims, 5 Drawing Sheets

(56) References Cited

OTHER PUBLICATIONS

Randel et al, 6×56-Gb per s mode-division multiplexed transmission over 33-km few-mode fiber, Aug. 2011, Optics Express, All Document. (Year: 2011).*

International Search Report and Written Opinion received for PCT Application No. PCT/US2024/030152, Sep. 16, 2024, 14 pages.

M. Sleiffer, et al., "High Capacity Mode-Division Multiplexed Optical Transmission in a Novel 37-cell Hollow-Core Photonic Bandgap Fiber", Journal of Lightwave Technology—IEEE, vol. 32, Issue 4, Jul. 19, 2013, pp. 854-863.

M. Sleiffer, et al., "Ultra-high capacity transmission with few-mode silica and hollow-core photonic bandgap fibers", OFC—IEEE, Mar. 9, 2014, pp. 1-3.

International Preliminary Report on Patentability (Chapter I) received for PCT Application No. PCT/US2024/030152, Dec. 11, 2025, 9 pages.

* cited by examiner

MONITORING COHERENT OPTICAL SERVICE CHANNEL

BACKGROUND

The capacity demands for communication networks is ever increasing. Various techniques have been devised for meeting these capacity demands, including optical networks can support large capacities. Specifically, optical fibers carry a large amount of data in modern telecommunication systems. Given the importance of optical fibers as the medium carrying information, it is also important to monitor the operating parameters of optical fibers including their operating condition parameters, transient events affecting the operation of the optical fiber, and parameters that may predict the future operating condition of the optical fibers.

SUMMARY

A system for monitoring coherent optical service channel includes a multi-mode transmitter configured to generate a dual-polarization signal based on an input signal, a hollow core fiber (HCF) configured to transmit the multiple polarization signal, a receiver configured to receive the multiple polarization signal, and a digital signal processor (DSP) configured to monitor one or more operating parameters of the received multiple polarization signal. The multiple polarization signal may use both phase and the amplitude polarization to multiplex the optical signal. Alternatively, the multiple polarization signal may use phase and the frequency polarizations to multiplex the optical signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The technology to be covered by this patent application offers a new method to monitor fiber status, as well transient events using coherent optics, which modulates the amplitude and phase of light to send the signal across a fiber in multiple polarizations. Multiple-mode multiplexing is used to combine frequency multiplexing as well as phase multiplexing. This allows determination of various parameters such as intermodal interference, SOP (state of polarization), PMD (polarization mode dispersion), DGD (differential group delay) to monitor the status and existence of transient events such as lightning, etc.

Figure 1:
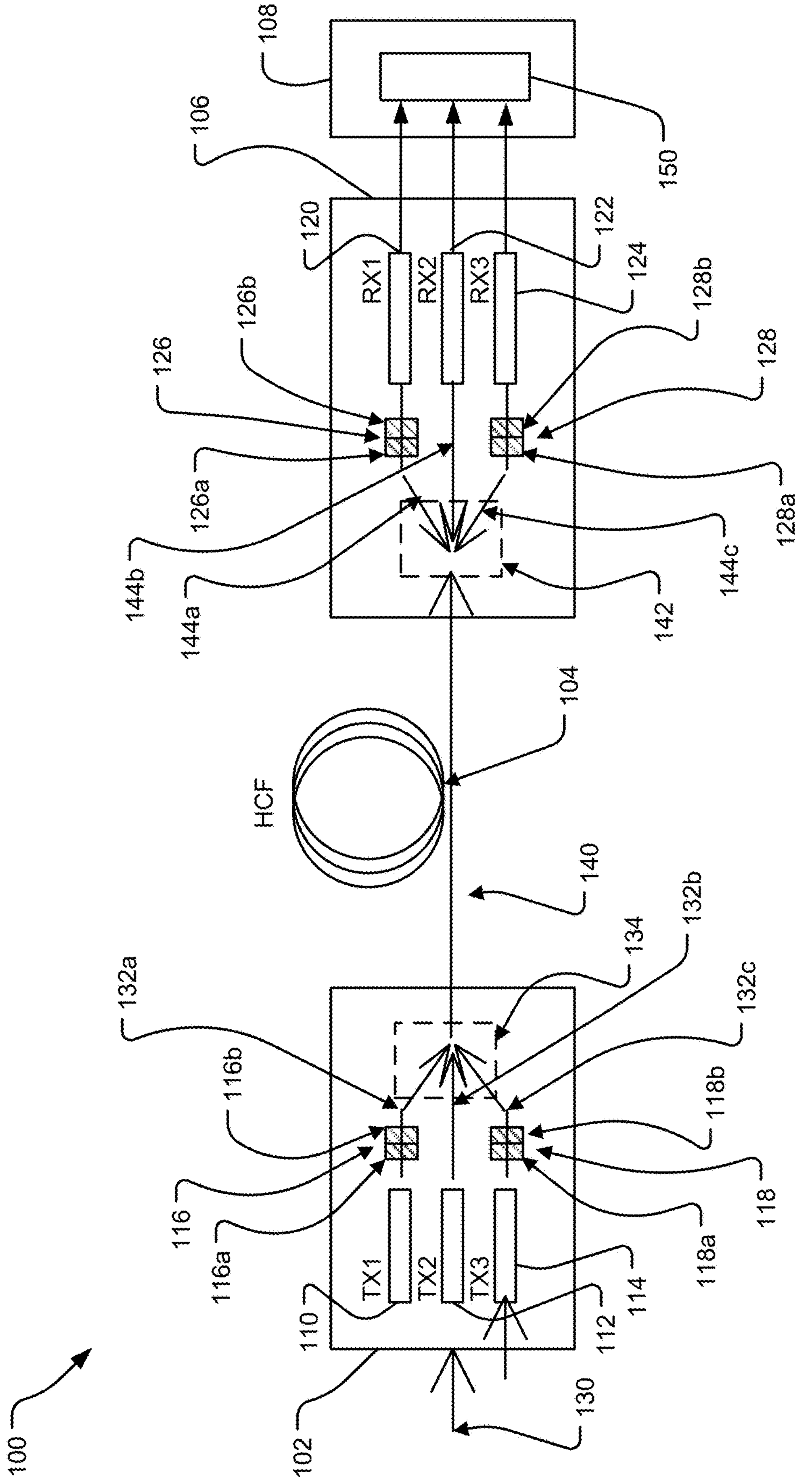
FIG. 1 illustrates an example implementation of a monitoring system for a coherent optical service channel.

FIG. 1 illustrates an implementation of a monitoring system for a coherent optical service channel (OSC) 100. The coherent OSC 100 includes a multi-mode transmitter (also referred to as multimodal transmitter) 102 that is configured to multiplex an incoming optical signal onto a hollow core fiber (HCF) 104. The HCF 104 communicates the multiplexed optical signal over to a multi-receiver 106. The multi-receiver 106 receives the optical signal and to demultiplex the received optical signal. The demultiplexed optical signal is input into a digital signal processor (108) that is configured to determine various operating parameters of the OSC 100.

The multi-mode transmitter 102 may be a multimodal transmitter that multiplexes multiple optical signals onto a single carrier frequency for transmission over the HCF 104. Specifically, the multi-mode transmitter 102 may be configured to receive an incoming optical signal 130 and modulate the amplitude and phase of the optical signal 130. Furthermore, the multi-mode transmitter 102 is also configured to transmit the modulated signal across two polarizations so as to enable communicating considerably more information through an HCF 104. Specifically, the multi-mode transmitter 102 takes the ones and zeroes in incoming optical signal 130 and modulates the amplitude and phase of the light of the incoming optical signal 130 to generate a modulated optical signal 140. The modulated optical signal 140 is communicated over the HCF 104 over each of two polarizations.

An example of the multi-mode transmitter 102 may include a number of transmitters 110-114. For example, in the illustrated implementation, the multi-mode transmitter 102 includes three transmitters 110,112, and 114, in an alternate implementation, a different number of transmitters, such as 5, 7, etc., may be used in the multi-mode transmitter 102. Each of the transmitters 110-114 may be a quadrature phase shift keying (QPSK) transmitter. In such an implementation, each of the transmitters 110-114 uses a serial to parallel converter to alternatively send bits of the incoming optical signal 130 to two binary pattern generators to produce two baseband binary waveforms. In an alternative implementation, the transmitters 110-114 may also be implemented as binary phase shift keying (BPSK) transmitters.

The incoming optical signal 130 may include a number of optical signals in parallel. For example, in the illustrated implementation, the incoming optical signal 130 includes three parallel signals, each one of them being input to one of the transmitters 110-114. Each of the transmitters 110-114 may generate an output optical signal with different linear polarization (LP). An LP mode of an optical signal signifies the confinement of the electromagnetic field of the optical signal to a given plane along the direction of propagation of the optical signal. In the illustrated implementation, the transmitter $TX_2$ 112 may generate an optical signal with polarization of $LP_{01}$, the transmitter $TX_1$ 110 may generate an optical signal with polarization of $LP_{11a}$, and the transmitter $TX_3$ 114 may generate an optical signal with polarization of $LP_{11b}$.

The multi-mode transmitter 102 also includes modulating phase plates 116 and 118 to add phase shift to optical signals received from the transmitters 110-114. The modulating phase plates 116 and 118, also known as waveplates, may be made of glass. The modulating phase plates 116 and 118 may generate a higher order mode of one of the multiple optical signals before the one of the multiple optical signals is multiplexed. For example, the modulating phase plates 116 and 118 may add half-wave phase shift, quarter-wave phase shift, etc. Specifically, the modulating phase plate 116 adds phase shift to the $LP_{11a}$ optical signal output from the transmitter 110 and the modulating phase plate 118 adds phase shift to the $LP_{11b}$ optical signal output from the transmitter 114. In one implementation, the left portions 116*a* and 118*a* may add a phase shift of pi (Π) and the right portions 116*b* and 118*b* may add zero (0) phase shifts to the optical signals output from the transmitters 110 and 114.

The optical signals 132 (132*a*, 132*b*, and 132*c*) output after the phase changes to the $LP_{11a}$ and $LP_{11b}$ optical signals, are input into a multiplexer 134. The multiplexer 132 that allows mode-selective excitation of three mode of fiber. Specifically, the multiplexer 132 multiplexes optical signal with different linear polarity (LP) and phase shifts into the HCF 104. The multiplexed optical signal 140 output from the multi-mode transmitter 102 includes optical signals with six different modes. In one implementation, the multiplexer 132 generate the multiplexed optical signal 140 that is space division multiplexed dual-polarization signal.

The HCF 104 maybe an optical fiber which guides the multiplexed optical signal 140 within a hollow region, such that only a minor portion of the optical signal 130 propagates in the solid fiber material (typically a glass) that forms the HCF 104. The HCF 104 allows the multiplexed optical signal 140 to travel through the air or any other medium, such as vacuum inside it at up to 300,000 km-per-second, which is almost 50 percent faster than the 200,000 km-per-second speed available in solid glass fiber. This allows cutting latency in communication of information via the multiplexed optical signal 140.

In the illustrated implementation, the HCF 104 transmits the multiplexed optical signal 140 that includes optical signals with different LPs and phase shifts over to a multi-receiver 106. The multi-receiver 106 may be a multimodal receiver that demultiplex the multiplexed optical signal received from the HCF 104. The multi-receiver 106 may include a demultiplexer 142 that demultiplexes optical signals having different LP into three different optical signals 144*a*, 144*b*, and 144*c*. Specifically, the optical signal 144*a* has a polarity of $LP_{11a}$, the optical signal 144*b* has the polarity of $LP_{01}$, and the optical signal 144*c* has polarity of $LP_{11b}$.

The de-multiplexed signals 144*a* and 144*c* are input to demodulating phase plates 126 and 128 that adds phase shifts. Specifically, the demodulating phase plate 126 adds a phase shift to the optical signal 144*a* with LP of $LP_{11a}$ that is reverse of the phase shift added by the modulating phase plate 116 of the multi-mode transmitter 102. Similarly, the demodulating phase plate 128 adds a phase shift to the optical signal 144*c* with LP of $LP_{11b}$ that is reverse of the phase shift added by the modulating phase plate 118 of the multi-mode transmitter 102. In one implementation, the left portions 126*a* and 128*a* may add a phase shift of pi (I) and the right portions 126*b* and 128*b* may add zero (0) phase shifts to the de-multiplexed signals 144*a* and 144*c*.

The phase shifted optical signals 144*a* and 144*c* as well as the optical signal 144*b* are input into receivers $RX_1$ 120, $RX_2$ 122, and $RX_3$ 124. Each of the receivers 120-124 may convert the input signals with different LPs to an electrical signal that is coupled to a digital signal processor (DSP) 108. Depending on the architecture of the transmitters 110-114, the receivers 120-124 may be implemented as quadrature phase shift keying (QPSK) receivers or as binary phase shift keying (BPSK) receivers. Each of the receivers 120-124 may depolarize the optical signals 144*a*-144*c*. Specifically, each of the receivers 120-124 may depolarize the optical signals input there into by an amount that is opposite to the polarization provided by the transmitters 110-114, respectively.

The DSP 108 may be implemented using a field programmable gate array (FPGA), a reduced instruction set computer (RISC), etc. In one implementation, the DSP 108 is implemented using FPGA and it includes a multiple-input/multiple-output (MIMO) processor 150 with FPGA open line system.

The MIMO processor 150 continuously monitors the signals output from each of the receivers 120-124 for any transient events. Specifically, the MIMO processor 150 analyzes the outputs from the receivers 120-124 to determine various operational parameters of the OSC 100. For example, the MIMO processor 150 may determine one or more of intermodal interference, state of polarization (SOP), polarization mode dispersion (PMD), differential group delay (DGD), etc. The implementation of the OSC 100 allows determining one or more of these operating parameters because of the use of implementation using multiple transmitters and multiple receivers as disclosed herein. Specifically, because the multiplexed optical signal 140 includes optical signals with six different modes, the MIMO processor is able to determine higher number of operating parameters of the OSC 100.

Figure 2:
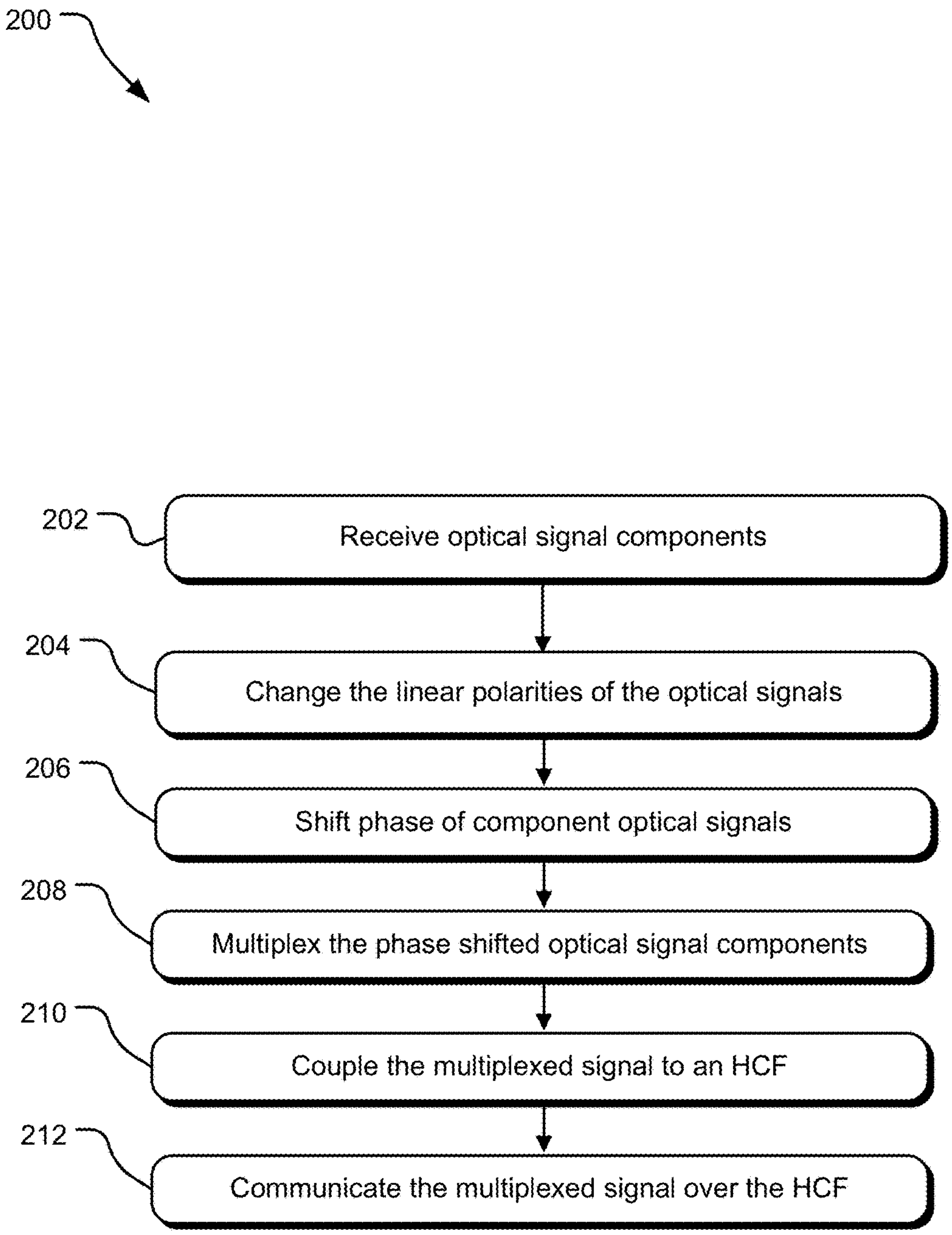
FIG. 2 illustrates example operations for communicating data over a coherent optical service channel.

FIG. 2 illustrates operations 200 for communicating data over a coherent optical service channel. One or more of the operations 200 may be implemented at a multi-mode transmitter such as the multi-transmitter 102 disclosed in FIG. 1. An operation 202 receives various optical signal components that are to be communicated over a hollow core fiber (HCF). In one implementation, the operation 202 may receive three optical signal components. The optical signal components are coupled to a transmitters of a multi-mode transmitter circuit. For example, the transmitters may be QPSK transmitter, BPSK transmitter, etc. An operation 204 changes the linear polarities of the optical signal components. For example, the transmitter may change the polarities of the optical signals to be $LP_{01}$, $LP_{11a}$, and $LP_{11b}$.

At operation 206, selected of the optical signal components with different polarities are input into a phase shift plates to shift the phase of the selected optical signal components. For example, the operation 206 may shift an optical signal component by 45 degrees, 90 degree, etc. Subsequently, at an operation 208, the phase shifted optical components are multiplexed into a single multiplexed optical signal that can be communicated over a fiber. An operation 210 couples the multiplexed optical signal onto a hollow core fiber (HCF) and at operation 212 the multiplexed optical signal is communicated over the HCF.

Figure 3:
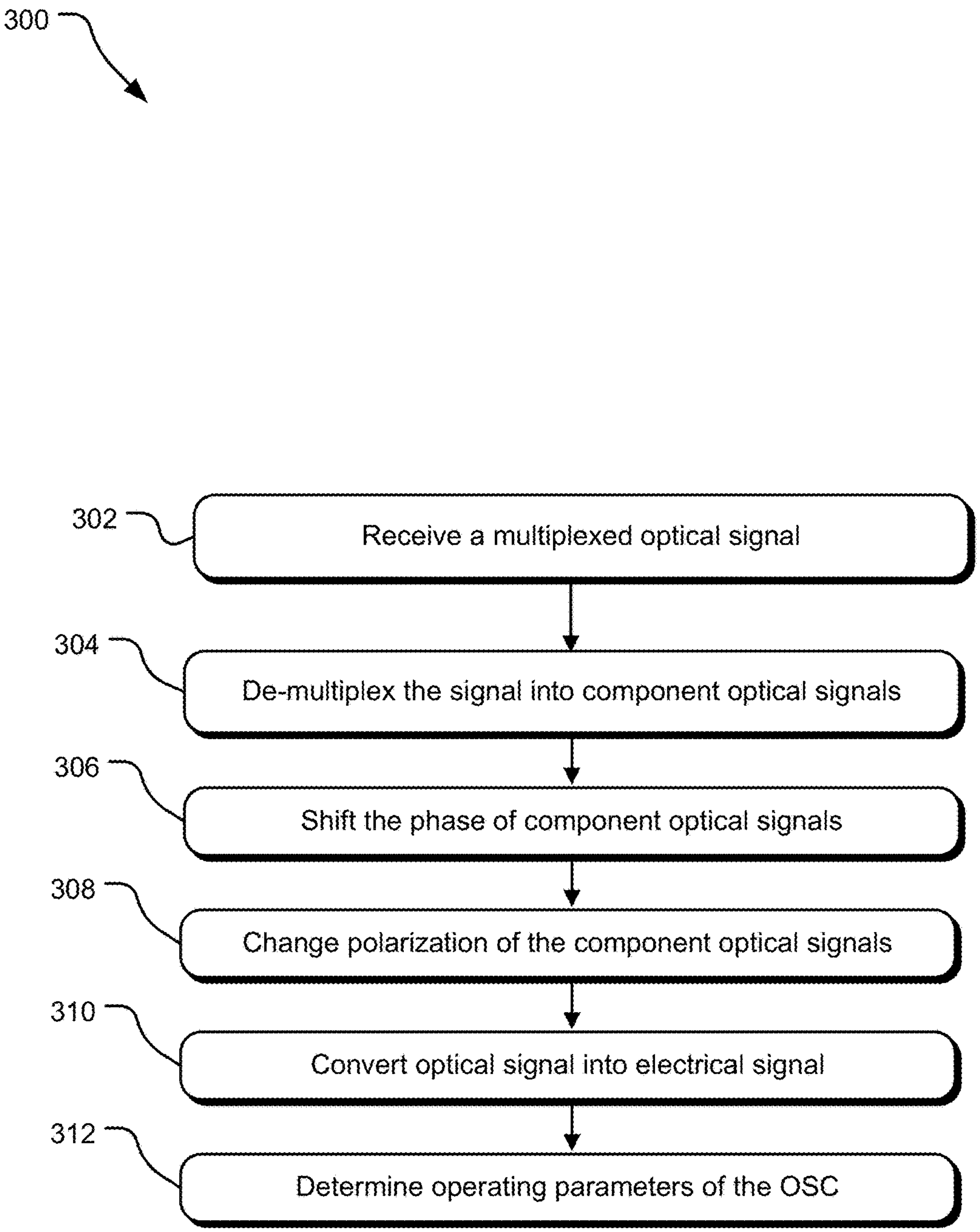
FIG. 3 illustrates example operations for monitoring operating parameters of a coherent optical service channel.

FIG. 3 illustrates example operations 300 for monitoring operating parameters of a coherent optical service channel. One or more of the operations 300 may be implemented at a multi-receiver such as the multi-receiver 106 disclosed in FIG. 1. An operation 302 receives a multiplexed optical signal. For example, such multiplexed optical signal may be received from an HCF. An operation 304 demultiplexes the received signal into component optical signals. Subsequently, an operation 306 shifts the phase of the component optical signals. For example, the phase of the component optical signals may be shifted using phase plates or wave plates. An operation 308 changes the polarizations of the component optical signals. For example, a series of QPSK receivers may be used to change the polarizations of the component optical signals. The QPSK receivers may output the optical signal components on separate output lines in parallel that may be converted into electrical signals for further processing. In one implementation, the operation 310 depolarizes the component optical signals by an amount that is opposite to the amount of polarization of the component optical signals provided by the operation 204.

An operation 310 converts the component optical signals into electrical signals and inputs them into a MIMO processor of a DSP. An operation 312 may process the received electrical signals to determine various operating parameters of the OSC. For example, in one implementation, the operation 312 may determine one or more of intermodal interference, state of polarization (SOP), polarization mode dispersion (PMD), differential group delay (DGD), etc.

Figure 4:
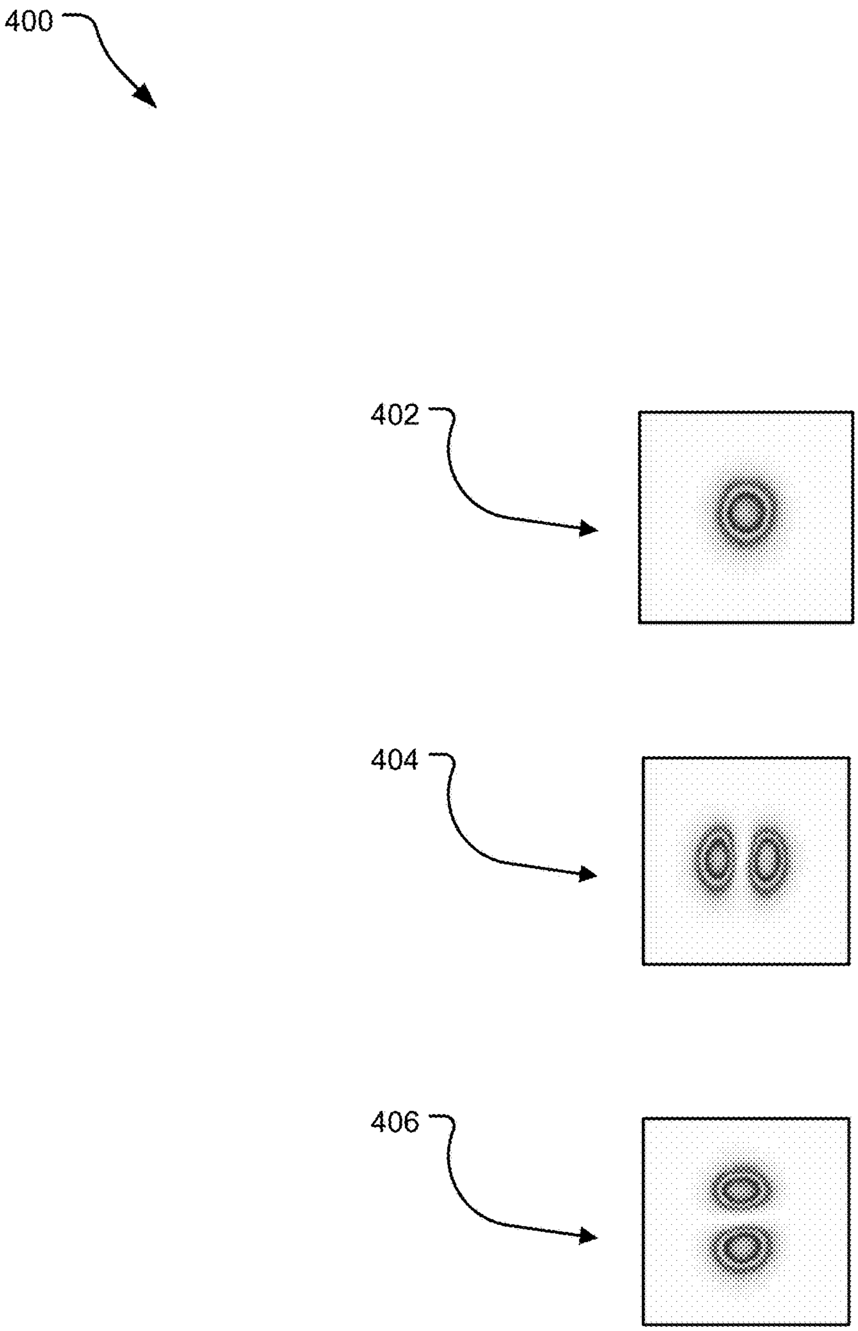
FIG. 4 illustrates the polarizations of optical signal components that may be communicated using the optical signal channel disclosed herein.

FIG. 4 illustrates the polarizations 400 of optical signal components that may be communicated using the optical signal channel disclosed herein. Specifically, 402 illustrates the $LP_{01}$ polarization, 404 illustrates the $LP_{11a}$ polarization, and 406 illustrates the $LP_{11b}$ polarization. Specifically, the $LP_{01}$ polarization 402 is the fundamental or the lowest order mode and it exhibits symmetrical amplitude such that it can be polarized either along the x or the y axis. The $LP_{11a}$ polarization 404 and the $LP_{11b}$ polarization 406 each show lobe orientations along x axis and y-axis, respectively. The optical service channel disclosed herein communicates multiplexed optical signal that includes combination of three polarizations and two phases, thus, having a 6×6 matrix at the multi-mode transmitter and a 6×6 matrix at the multi-receiver, which allows analysis of the operating parameters of the OSC in real time.

The monitoring system for coherent optical service channel (OSC) described herein provides technical advantages over existing by allowing real-time monitoring of operating parameters of the OSC. Thus, if there is any damage to the open channel fiber, such as a tear, a breakage, any damage to the fiber due to electric storm or lightning, etc., the changes observed in the operating parameters, such as SOP, PMD, DGD, etc., allows quick identification of the damage and the required maintenance.

Figure 5:
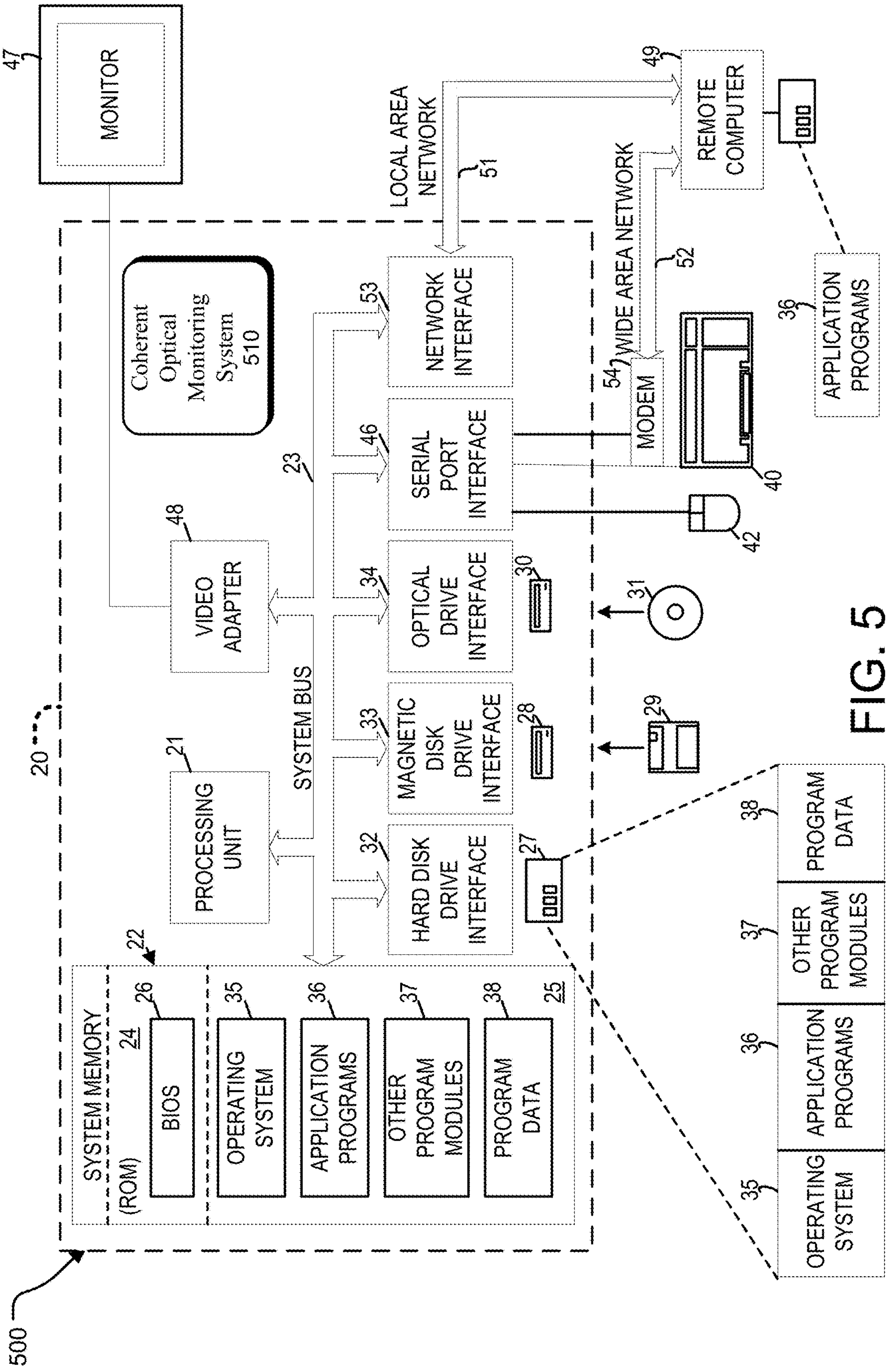
FIG. 5 illustrates an example system that may be useful in implementing the high latency query optimization system disclosed herein.

FIG. 5 illustrates an example system 500 that may be useful in implementing the high latency query optimization system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 4. Similarly, instructions stored on the memory of the computer 20 may also be used to implement one or more operations of FIG. 1. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the coherent optical monitoring system 510 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation discloses a system including a transmitter configured to generate a multiple polarization optical signal based on an optical input signal, a hollow core fiber (HCF) configured to transmit the multiple polarization optical signal, a receiver configured to receive the multiple polarization optical signal, and a digital signal processor (DSP) configured to monitor one or more operating parameters of the received multiple polarization optical signal.

An alternative implementation discloses an optical service channel including a multimodal transmitter configured to generate a multiple polarization optical signal based on an optical input signal, the multimodal transmitter including a plurality of transmitters, each of the plurality of transmitters configured to generate a polarized optical signal with different linear polarizations, a plurality of modulating phase plates, wherein each of the plurality of modulating phase plates is configured to shift phase of one of the polarized optical signals to generate phase shifted polarized optical signals, and a multiplexer configured to multiplex the phase shifted polarized optical signals to generate a multiplexed optical signal.

A method disclosed herein includes receiving a plurality of optical signal components, changing linear polarity of one or more of the plurality of optical signal components using QPSK transmitters to generate a plurality of polarized optical signals, shifting phase of at least one or more of plurality of polarized optical signal components using modulating phase plates to generate a plurality of modulated polarized optical signals, and multiplexing the plurality of modulated polarized optical signals to generate an open channel fiber (HCF) optical signal.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system, comprising:

a transmitter configured to generate a multiple polarization optical signal based on an optical input signal;

a hollow core fiber (HCF) configured to transmit the multiple polarization optical signal;

a receiver configured to receive the multiple polarization optical signal; and a digital signal processor (DSP) configured to monitor one or more operating parameters of the received multiple polarization optical signal, wherein the one or more operating parameters of the received multiple polarization optical signal comprising intermodal interference and polarization mode dispersion (PMD) of the received multiple polarization optical signal, wherein the transmitter is a multimodal transmitter configured to multiplex multiple optical signals onto a single carrier frequency for transmission over the HCF, and wherein the transmitter further comprising a plurality of modulating phase plates, each of the plurality of modulating phase plates configured to generate a higher order mode of one of the multiple optical signals before the one of the multiple optical signals is multiplexed.

2. The system of claim 1, wherein the receiver is a multimodal receiver configured to demultiplex a multiplexed optical signal received from the HCF.

3. The system of claim 2, wherein the receiver further comprising a plurality of demodulating phase plates, each of the plurality of demodulating phase plates configured to demodulate higher order modes from the demultiplexed signal.

4. The system of claim 3, wherein the DSP is further configured to determine at least one of a state of polarization (SOP), a polarization mode dispersion (PMD), and differential group delay (DGD) of the HCF based on the demodulated higher order modes from the demultiplexed signal.

5. The system of claim 1, wherein the transmitter is a multimodal quadrature phase shift keying (QPSK) transmitter.

6. An optical service channel, comprising:

a multimodal transmitter configured to generate a multiple polarization optical signal based on an optical input signal, the multimodal transmitter including:

a plurality of transmitters, each of the plurality of transmitters configured to generate a polarized optical signal with different linear polarizations;

a plurality of modulating phase plates, wherein each of the plurality of modulating phase plates is configured to shift phase of one of the polarized optical signals to generate phase shifted polarized optical signals;

a multiplexer configured to multiplex the phase shifted polarized optical signals to generate a multiplexed optical signal; and a digital signal processor (DSP) configured to monitor one or more operating parameters of multiple polarization optical signal, wherein the one or more operating parameters of the received multiple polarization optical signal comprising intermodal interference and polarization mode dispersion (PMD) of the received multiple polarization optical signal.

7. The optical service channel of claim 6, wherein the plurality of transmitters further comprising:

a first transmitter configured to generate a polarized optical signal with $LP_{01}$ polarization, a second transmitter configured to generate a polarized optical signal with $LP_{11a}$ polarization; and a third transmitter configured to generate a polarized optical signal with $LP_{11b}$ polarization.

8. The optical service channel of claim 7, wherein the plurality of modulating phase plates further comprising:

a first modulating phase plate configured to shift phase of the optical signal with $LP_{11a}$ polarization; and a second modulating phase plate configured to shift phase of the optical signal with $LP_{11b}$ polarization.

9. The optical service channel of claim 8, wherein the multiplexer is further configured to couple the multiplexed optical signal onto a hollow core fiber (HCF).

10. The optical service channel of claim 9, wherein the HCF is configured to communicate the multiplexed optical signal to a multimodal receiver.

11. The optical service channel of claim 10, wherein the multimodal receiver comprising a demultiplexer configured to demultiplex the multiplexed optical signal to generate three demultiplexed optical signals.

12. The optical service channel of claim 11, wherein the multimodal receiver further comprising:

a first demodulating phase plate configured to shift phase of the optical signal with $LP_{11a}$ polarization; and a second demodulating phase plate configured to shift phase of the optical signal with $LP_{11b}$ polarization.

13. The optical service channel of claim 12, wherein the multimodal receiver further comprising three receivers, each of the three receivers configured to depolarize the signals input there into by an amount opposite to the polarization provided by the first, the second, and the third transmitter, respectively.

14. The optical service channel of claim 13 further comprising a digital signal processor configured to receive depolarized outputs from the three receivers and to determine at least one of a state of polarization (SOP), a polarization mode dispersion (PMD), and differential group delay (DGD) of the HCF based on a demodulated higher order modes from the demultiplexed signal.

15. A method, comprising:

receiving a plurality of optical signal components;

changing linear polarity of one or more of the plurality of optical signal components using QPSK transmitters to generate a plurality of polarized optical signals;

shifting phase of at least one or more of plurality of polarized optical signal components using modulating phase plates to generate a plurality of modulated polarized optical signals;

multiplexing the plurality of modulated polarized optical signals to generate an open channel fiber (HCF) optical signal; and monitoring one or more operating parameters of a received multiple polarization optical signal using a digital signal processor (DSP);

wherein the one or more operating parameters of the received multiple polarization optical signal comprising intermodal interference and polarization mode dispersion (PMD) of the received multiple polarization optical signal.

16. The method of claim 15, further comprising coupling the HCF optical signal onto HCF.

17. The method of claim 16, further comprising;

receiving the HCF optical signal at a receiver;

demultiplexing the HCF optical signal to generate a plurality of demultiplexed optical signal components;

shifting phase of at least one or more of plurality of demultiplexed optical signal components using demodulating phase plates to generate a plurality of demodulated polarized optical signal components; and changing linear polarity of one or more of the demodulated polarized optical signal components using QPSK receiver to generate a plurality of depolarized optical signal components.

18. The method of claim 17, further comprising processing the depolarized optical signal components to determine at least one of a state of polarization (SOP), a polarization mode dispersion (PMD), and differential group delay (DGD) of the HCF based on a demodulated higher order modes from the depolarized optical signal components.

* * * * *